(12) United States Patent
Tanigawa et al.

(10) Patent No.: US 11,879,556 B2
(45) Date of Patent: Jan. 23, 2024

(54) CHECK VALVE UNIT AND AIR-CONDITIONING APPARATUS, AND METHOD FOR MANUFACTURING CHECK VALVE UNIT

(71) Applicant: Mitsubishi Electric Corporation, Tokyo (JP)

(72) Inventors: Tsukasa Tanigawa, Tokyo (JP); Munehiro Yamanaka, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 14 days.

(21) Appl. No.: 17/796,445

(22) PCT Filed: Mar. 30, 2020

(86) PCT No.: PCT/JP2020/014510
§ 371 (c)(1),
(2) Date: Jul. 29, 2022

(87) PCT Pub. No.: WO2021/199139
PCT Pub. Date: Oct. 7, 2021

(65) Prior Publication Data
US 2023/0160481 A1    May 25, 2023

(51) Int. Cl.
*F16K 15/02*       (2006.01)
*F25B 41/20*       (2021.01)

(52) U.S. Cl.
CPC .......... *F16K 15/023* (2013.01); *F25B 41/20* (2021.01); *F16K 15/021* (2013.01); *Y10T 137/7904* (2015.04); *Y10T 137/7913* (2015.04)

(58) Field of Classification Search
CPC ...... F16K 15/021; F16K 15/023; F25B 41/20; Y10T 137/7913; Y10T 137/7904
See application file for complete search history.

(56) References Cited

U.S. PATENT DOCUMENTS 3,157,191 A * 11/1964 Garrett .................. F16K 15/026
                                                   137/332
D318,098 S * 7/1991 Rizer ........................... D23/249
(Continued)

FOREIGN PATENT DOCUMENTS

CN    209743160 U    12/2019
EP    3 951 223 A1    2/2022
(Continued)

OTHER PUBLICATIONS

Extended European Search Report dated Apr. 25, 2023 issued in corresponding European Patent Application No. 20929333.1.
(Continued)

*Primary Examiner* — Craig M Schneider
*Assistant Examiner* — Frederick D Soski
(74) *Attorney, Agent, or Firm* — POSZ LAW GROUP, PLC (57) ABSTRACT

A check valve unit 1 includes: a container body 2 including a valve body housing portion 21, a valve seat 22, and a protruding portion 23, the valve body housing portion 21 having a cylindrical shape, the valve seat 22 being formed at one end portion of the valve body housing portion 21 and protruding from an inner peripheral surface of the valve body housing portion 21, the protruding portion 23 being formed at the other end portion of the valve body housing portion 21 and protruding from the inner peripheral surface of the valve body housing portion 21; and a valve body 3 including a valve portion 31 and a guide portion 32 and disposed in the container body 2, the valve portion 31 coming into contact with the valve seat 22 at a time of preventing backflow of refrigerant, the guide portion 32 including a plurality of blades.

7 Claims, 5 Drawing Sheets

(56) References Cited

U.S. PATENT DOCUMENTS

| | | | | |
|---|---|---|---|---|
| 5,154,589 | A | * | 10/1992 | Ruhl .................... F04B 49/225 |
| | | | | 137/332 |
| D576,704 | S | * | 9/2008 | Gilcher ........................ D23/233 |
| D725,747 | S | * | 3/2015 | Alexander ................... D23/233 |
| D728,072 | S | * | 4/2015 | Alexander ................... D23/233 |
| D739,919 | S | * | 9/2015 | Alexander ................... D23/233 |
| 10,767,773 | B2 | * | 9/2020 | Lee ......................... B60T 17/04 |
| 2019/0063633 | A1 | | 2/2019 | Nuiya |
| 2021/0190225 | A1 | * | 6/2021 | Auweder .............. F16K 15/063 |
| 2022/0134407 | A1 | * | 5/2022 | Tanigawa .................. B21J 5/08 |
| | | | | 72/58 |
| 2023/0160481 | A1 | * | 5/2023 | Tanigawa ................ F16K 15/06 |
| | | | | 137/528 |

FOREIGN PATENT DOCUMENTS

| | | |
|---|---|---|
| JP | S59-163270 U | 11/1984 |
| JP | 2001-324037 A | 11/2001 |
| JP | 2003-154414 A | 5/2003 |
| JP | 2006-046539 A | 2/2006 |
| JP | 2013-044418 A | 3/2013 |
| JP | 2013-158802 A | 8/2013 |
| JP | 2019-039541 A | 3/2019 |

OTHER PUBLICATIONS

Office Action dated Feb. 28, 2023 issued in corresponding JP Patent Application No. 2022-512887 (and English machine translation).
International Search Report of the International Searching Authority dated Jun. 2, 2020 in corresponding international application No. PCT/JP2020/014510 (and English translation).

* cited by examiner

CHECK VALVE UNIT AND AIR-CONDITIONING APPARATUS, AND METHOD FOR MANUFACTURING CHECK VALVE UNIT

CROSS REFERENCE TO RELATED APPLICATION

This application is a U.S. national stage application of PCT/JP2020/014510 filed on Mar. 30, 2020, the contents of which are incorporated herein by reference.

TECHNICAL FIELD

The present disclosure relates to a check valve unit used in a refrigeration cycle of an air-conditioning apparatus, for example, and to a method for manufacturing a check valve unit.

BACKGROUND ART

An air-conditioning apparatus includes a refrigeration cycle through which refrigerant cycles, the refrigeration cycle being formed of a compressor, a condenser, an expansion valve, an evaporator, and the like. In such a refrigeration cycle, a check valve may be further installed to cause refrigerant to flow through the refrigeration cycle only in one direction (see Patent Literature 1, for example).

CITATION LIST

Patent Literature

Patent Literature 1: Japanese Unexamined Patent Application Publication No. 2013-44418

SUMMARY OF INVENTION

Technical Problem

As disclosed in Patent Literature 1, a related-art check valve includes a large diameter portion, small diameter portions, and tapered portions, the large diameter portion forming a tubular body and housing a valve assembly, the small diameter portions being located on both sides of the large diameter portion and forming an inlet port and an outlet port, the tapered portion being formed between each small diameter portion and the large diameter portion. Therefore, a check valve per se has a long dimension. Particularly, when a plurality of check valves are used in combination, an assembly of the check valves increases in size and hence, there is a problem that restrictions are imposed on the arrangement of the assembly when the assembly is mounted on an air-conditioning apparatus.

The present disclosure has been made to solve the above-mentioned problem, and it is an object of the present disclosure to provide a check valve unit in which minimal restrictions are imposed on the arrangement of the check valve unit due to a reduction in size when the check valve unit is mounted on an air-conditioning apparatus.

Solution to Problem

A check valve unit of an embodiment of the present disclosure includes: a container body including a valve body housing portion, a valve seat, and a protruding portion, the valve body housing portion having a cylindrical shape, the valve seat being formed at one end portion of the valve body housing portion and protruding from an inner peripheral surface of the valve body housing portion, the protruding portion being formed at the other end portion of the valve body housing portion and protruding from the inner peripheral surface of the valve body housing portion; and a valve body including a valve portion and a guide portion and disposed in the container body, the valve portion coming into contact with the valve seat at a time of preventing backflow of refrigerant, the guide portion including a plurality of blades.

Advantageous Effects of Invention

The check valve unit of the embodiment of the present disclosure is reduced in size compared with a related-art check valve, thus giving the higher degree of freedom in arrangement than the related-art check valve unit at the time of being mounted on an air-conditioning apparatus.

DESCRIPTION OF EMBODIMENTS

Hereinafter, a check valve unit and a method for manufacturing a check valve unit according to embodiments of the present disclosure will be described with reference to drawings and the like. In the respective drawings, identical or corresponding components are given the same reference symbols, and the description of such components is omitted or simplified when appropriate. The shapes, the sizes, the arrangement, and the like of the components described in the respective drawings may be suitably changed within the scope of the present disclosure.

Embodiment 1

Figure 1:
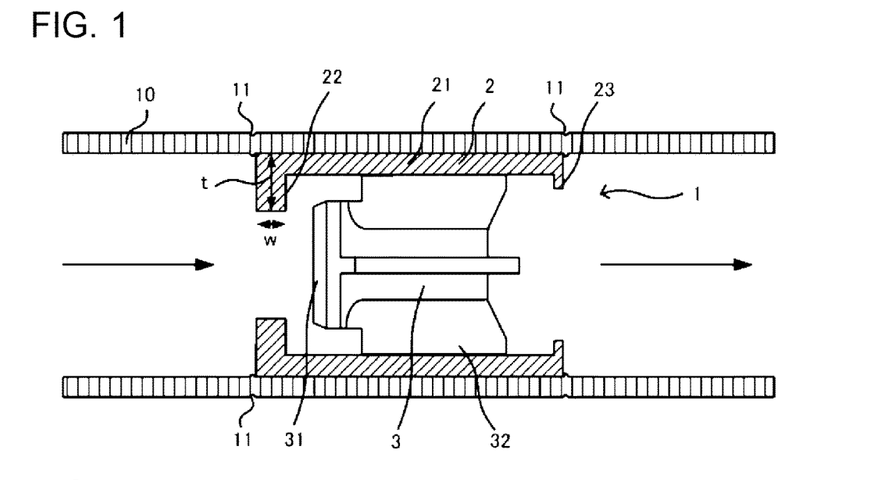
FIG. 1 is a cross-sectional view showing a state where a check valve unit according to Embodiment 1 of the present disclosure is mounted in a refrigerant pipe.

FIG. 1 is a cross-sectional view showing a state where a check valve unit according to Embodiment 1 of the present disclosure is mounted in a refrigerant pipe. A check valve unit 1 according to the present disclosure is mounted in a refrigerant pipe 10 forming the refrigeration cycle of an air-conditioning apparatus, and has a function of restricting the flow of refrigerant to only one direction by preventing backflow of refrigerant. An example of a method for mounting the check valve unit 1 in the refrigerant pipe 10 is that, at positions in front and in rear of where the check valve unit 1 is mounted, a plurality of protrusions 11 are formed from the outer side of the refrigerant pipe 10 by dimpling or the like to fix the check valve unit 1 in the refrigerant pipe 10. For the method for mounting the check valve unit 1 in the refrigerant pipe 10, a related-art method may be adopted where drawing is applied to the refrigerant pipe 10 at positions in front and in rear of where the check valve unit 1 is mounted.

The check valve unit 1 includes a container body 2 and a valve body 3. The container body 2 is an inner pipe having a cylindrical shape. The valve body 3 is disposed in the container body 2 and is movable in the axial direction.

The container body 2 is formed of a tube stock made of copper, and forms the body of the check valve unit 1. The container body 2 includes a valve body housing portion 21, a valve seat 22, and a protruding portion 23. The valve body housing portion 21 has a cylindrical shape and houses the valve body 3. The valve seat 22 is formed at one end portion of the valve body housing portion 21, and protrudes from the inner peripheral surface of the valve body housing portion 21. The protruding portion 23 is formed at the other end portion of the valve body housing portion 21, and protrudes from the inner peripheral surface of the valve body housing portion 21.

The valve body housing portion 21 houses the valve body 3 therein, and has a certain length to allow the valve body 3 to move in the axial direction according to the flow direction of refrigerant.

The valve seat 22 is formed at one end portion of the valve body housing portion 21 in the longitudinal direction, and protrudes from the inner peripheral surface of the valve body housing portion 21. The valve seat 22 forms an inlet for refrigerant when the refrigerant flows through the check valve unit 1 as shown by arrows in FIG. 1. The valve seat 22 is formed to have an inner diameter smaller than the inner diameter of the valve body housing portion 21, and is closed by the valve body 3 at the time of preventing backflow of refrigerant. The valve seat 22 is integrally formed with the valve body housing portion 21 by hydroforming, which will be described later.

The protruding portion 23 is formed at the other end portion of the valve body housing portion 21 in the longitudinal direction, and protrudes from the inner peripheral surface of the valve body housing portion 21. The protruding portion 23 forms an outlet for refrigerant when the refrigerant flows through the check valve unit 1 as shown by the arrows in FIG. 1. The protruding portion 23 is formed to have an inner diameter smaller than the inner diameter of the valve body housing portion 21, and has a function of confining the valve body 3 in the valve body housing portion 21 when refrigerant flows through the check valve unit 1.

The valve body 3 is disposed between the valve seat 22 and the protruding portion 23 in the container body 2, and moves in the axial direction in the valve body housing portion 21 according to the flow direction of refrigerant. When refrigerant flows from the valve seat 22 toward the protruding portion 23, the valve body 3 moves toward the protruding portion 23 in the valve body housing portion 21 to allow the refrigerant to pass through the check valve unit 1.

In contrast, when refrigerant flows from the protruding portion 23 toward the valve seat 22, the valve body 3 moves toward the inflow side in the valve body housing portion 21 and comes into contact with the valve seat 22, thus preventing the refrigerant from flowing back in the check valve unit 1.

The valve body 3 includes a valve portion 31 and a guide portion 32. The valve portion 31 is made of a resin, and comes into contact with the valve seat 22 at the time of preventing backflow of refrigerant. The guide portion 32 includes a plurality of blades. The valve portion 31 comes into contact with the valve seat 22 to close the opening port of the valve seat 22 at the time of preventing refrigerant from flowing back from the protruding portion 23 toward the valve seat 22. The guide portion 32 has a function of guiding the valve body 3 when the valve body 3 moves in the axial direction in the valve body housing portion 21, and the outer diameter of the guide portion 32 is substantially equal to the inner diameter of the valve body housing portion 21. The guide portion 32 includes the plurality of blades, and refrigerant flows through between the blades when the refrigerant flows from the valve seat 22 toward the protruding portion 23. In Embodiment 1, the guide portion 32 includes four blades arranged at equal angular intervals of 90 degrees. However, the number of blades is not limited to four.

Next, a method for manufacturing the check valve unit 1 according to Embodiment 1 will be described. FIG. 2 is a cross-sectional view showing each of steps of manufacturing the check valve unit 1 according to Embodiment 1 of the present disclosure.

Figure 2A:
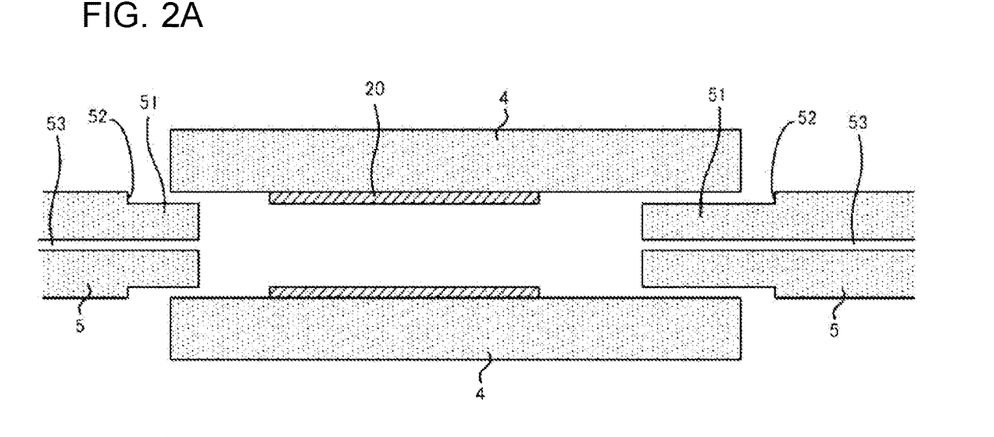
FIG. 2a is a cross-sectional view showing one of steps of manufacturing the check valve unit according to Embodiment 1 of the present disclosure.

As shown in FIG. 2a, first, a tube stock 20 having a cylindrical shape and forming the container body 2 is disposed in a state of being clamped by outer dies 4. In Embodiment 1, a hollow pipe made of copper and having a thickness of approximately 1.5 mm is used as the tube stock 20. The reason why copper is adopted as a material for forming the container body 2 is that copper has high workability and high durability, thus being suitable for hydroforming, which will be described later. A material is not limited to copper as long as the material can be worked by hydroforming.

Figure 2B:
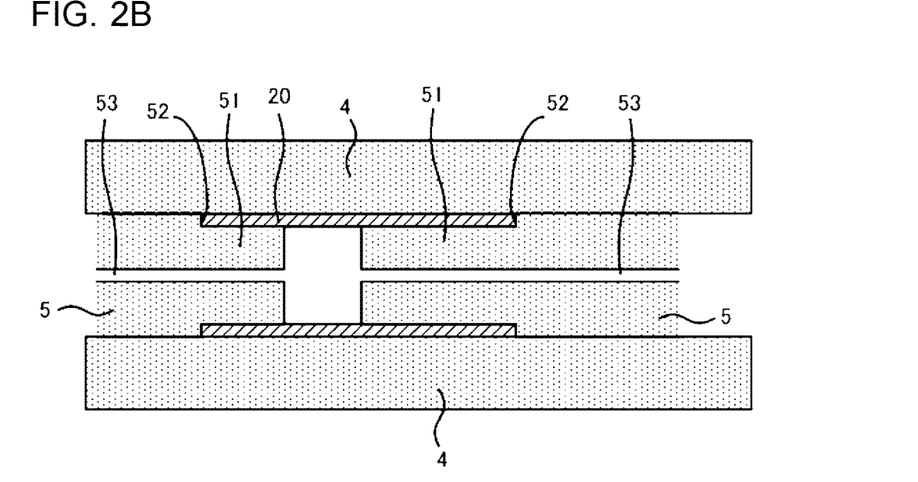
FIG. 2b is a cross-sectional view showing one of the steps of manufacturing the check valve unit according to Embodiment 1 of the present disclosure.

Next, the tube stock 20 is fixed by pushing shaft pushing tools 5 into the tube stock 20 from both ends of the tube stock 20 as shown in FIG. 2b. Each shaft pushing tool 5 includes an insertion portion 51, a pressing portion 52, and a nozzle hole 53. The insertion portion 51 is inserted into the tube stock 20. The pressing portion 52 is pressed against the end surface of the tube stock 20. Fluid, such as water, is fed into the tube stock 20 through the nozzle hole 53. The insertion portion 51 has a shape where the outer diameter of the insertion portion 51 is substantially equal to the inner diameter of the tube stock 20. Therefore, when the insertion portions 51 of the shaft pushing tools 5 are inserted into the tube stock 20 from both ends of the tube stock 20, the outer surfaces of the insertion portions 51 are brought into contact with the inner surface of the tube stock 20, and the tube stock 20 is clamped by the insertion portions 51 and the outer dies 4. In this step, the shaft pushing tools 5 are pushed into the tube stock 20 until the pressing portions 52 are brought into contact with the end surfaces of the tube stock 20.

Figure 2C:
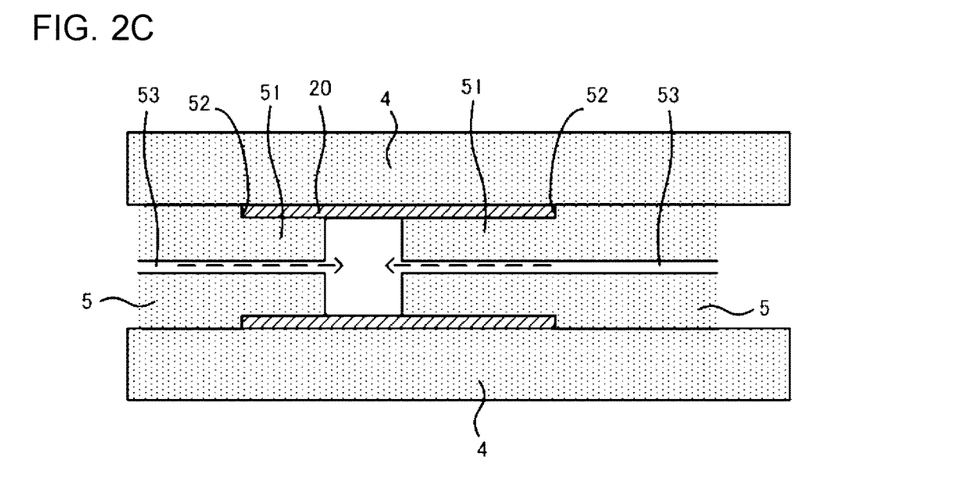
FIG. 2c is a cross-sectional view showing one of the steps of manufacturing the check valve unit according to Embodiment 1 of the present disclosure.

Next, as shown in FIG. 2c, the tube stock 20 is filled with fluid, such as water through the nozzle hole 53 to apply internal pressure. Arrows in FIG. 2c show a state where fluid passes through the nozzle holes 53 and flows into the tube stock 20.

Figure 2D:
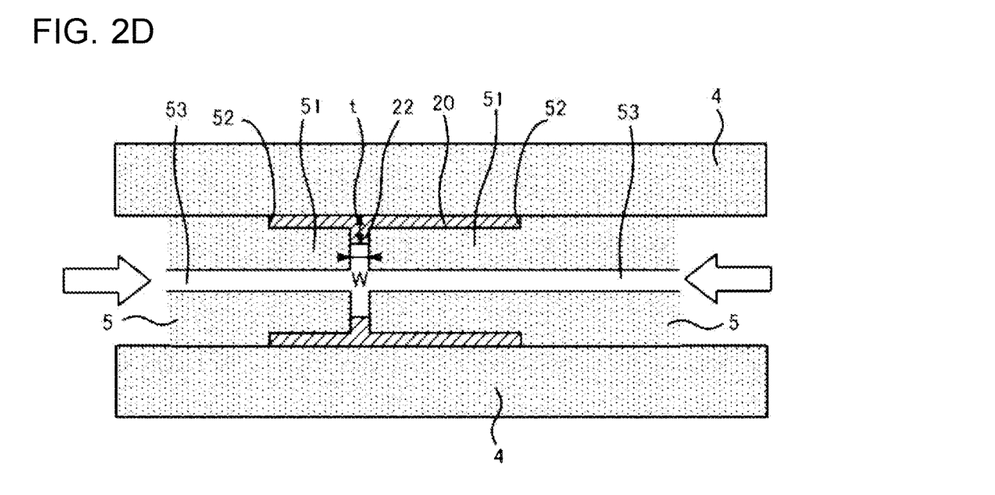
FIG. 2d is a cross-sectional view showing one of the steps of manufacturing the check valve unit according to Embodiment 1 of the present disclosure.

Next, from a state in the step shown in FIG. 2b, the shaft pushing tools 5 are further pushed into the tube stock 20 from both ends of the tube stock 20 as shown in FIG. 2d while a state is maintained where the inside of the tube stock 20 is filled with fluid. The tube stock 20 is pushed from both ends by the pressing portions 52 and hence, the tube stock 20 gathers at a portion that is not brought into contact with the insertion portions 51, so that the valve seat 22 is formed. At this point of operation, by pushing the shaft pushing tools 5 into the tube stock 20 from both ends in a state where internal pressure is applied to the tube stock 20 from the inside by fluid, the valve seat 22 can be formed while buckling is prevented. Applying the process by using fluid as described with reference to FIG. 2c and FIG. 2d is referred to as hydroforming or the hydroform process. By forming the valve seat 22 on the inner peripheral surface of the tube stock 20 by hydroforming, it is possible to form the opening port of the valve seat 22 coaxially with the tube stock 20. With such a configuration, it is possible to suppress leakage of refrigerant that may occur at the time of manufacture or due to deterioration over time.

Figure 2E:
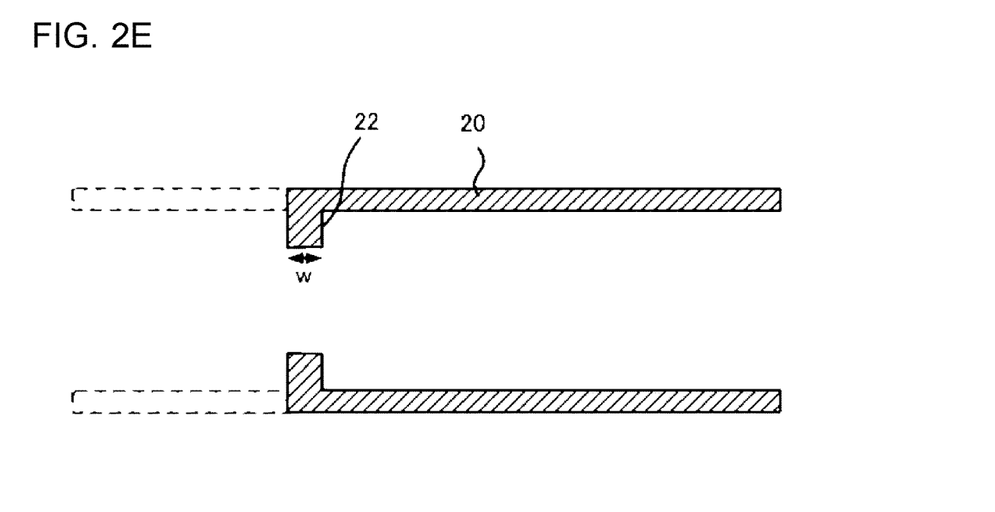
FIG. 2e is a cross-sectional view showing one of the steps of manufacturing the check valve unit according to Embodiment 1 of the present disclosure.

After the valve seat 22 is formed, the tube stock 20 is removed from the outer dies 4 and the shaft pushing tools 5 and, as shown in FIG. 2e, one side of the tube stock 20 is cut to cause the valve seat 22 to form one end portion. In Embodiment 1, the tube stock is cut off from the base of the valve seat 22. However, the tube stock may also be cut off from an intermediate portion of the valve seat 22 provided that the valve seat 22 can ensure a required width w. For example, when a valve seat having a width 2w or more is formed in the above-mentioned step of forming the valve seat 22 by pushing the shaft pushing tools 5 into the tube stock 20 from both ends of the tube stock 20 and when the formed valve seat is then cut at the center, it is possible to form a tube stock 20 including two valve seats 22 at one time. In this case, wasted portions are not formed when the tube stock is cut and hence, it is possible to reduce a material cost.

Figure 2F:
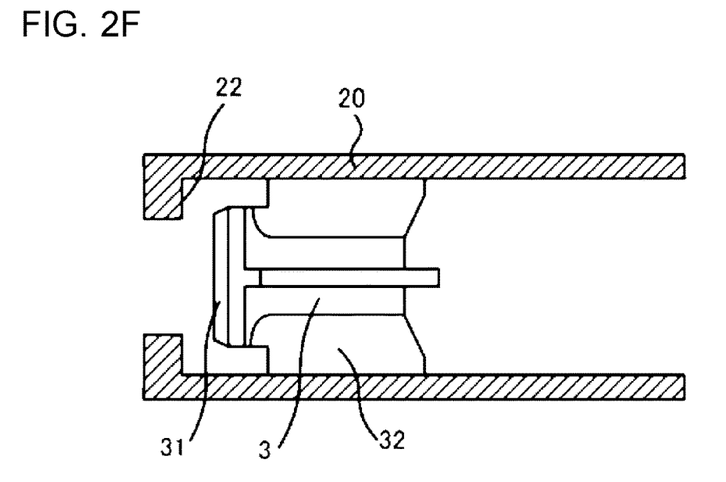
FIG. 2f is a cross-sectional view showing one of the steps of manufacturing the check valve unit according to Embodiment 1 of the present disclosure.

After the one side of the tube stock 20 is cut off, as shown in FIG. 2f, the valve body 3 is inserted into the tube stock 20 with the valve portion 31 being inserted first.

Figure 2G:
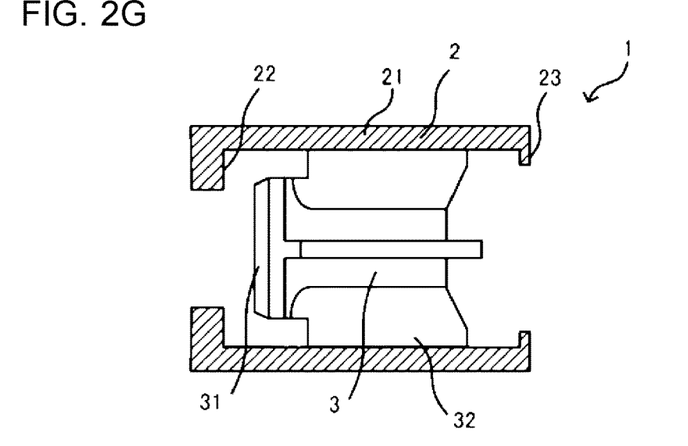
FIG. 2g is a cross-sectional view showing one of the steps of manufacturing the check valve unit according to Embodiment 1 of the present disclosure.

Lastly, as shown in FIG. 2g, the protruding portion 23 protruding inward is formed on the tube stock 20 at the other end portion, the other end portion being on a side opposite to the valve seat 22. For a method for forming the protruding portion 23, it is sufficient to adopt a method that causes the end portion of a pipe to protrude inward. An example of such a method includes terminal processing where a rotating roller is caused to come into contact with the tube stock 20 from the outside and pressure is applied to the tube stock 20, thus drawing the tube stock 20 inward. By performing the manufacturing steps shown in FIG. 2a to FIG. 2g as described above, the check valve unit 1 according to Embodiment 1 is obtained.

The check valve unit 1 according to the present disclosure includes neither the small diameter portions nor the tapered portions that are included in the related-art check valve, the small diameter portions forming the inlet port and the outlet port, each tapered portion being formed between the small diameter portion and the large diameter portion. Therefore, in the above-mentioned manufacturing method, the check valve unit 1 according to the present disclosure can be reduced in size. Further, the valve seat 22 is integrally formed with the valve body housing portion 21 by hydroforming and hence, the check valve unit 1 can be formed of two components, that is, the container body 2 and the valve body 3. Compared with the related-art check valve, the check valve unit 1 can reduce the number of parts and can simplify manufacturing steps, thus achieving a reduction in manufacturing cost.

A width w and a thickness t of the valve seat 22 can be adjusted by the degree at which the shaft pushing tools 5 are pushed into the tube stock 20 and by the length of the insertion portion 51 of each shaft pushing tool 5. The width w of the valve seat 22 is equal to a separation between the distal ends of the insertion portions 51 of two shaft pushing tools 5 when the shaft pushing tools 5 are pushed into the tube stock 20 as shown in FIG. 2d. The thickness t of the valve seat 22 is determined based on the width w and the degree at which the shaft pushing tools 5 are pushed into the tube stock 20 in the step shown in FIG. 2d. In other words, the volume of the tube stock 20 does not change between before and after the step shown in FIG. 2d. Therefore, the tube stock 20 gathers at a portion that is not brought into contact with the insertion portions 51 by an amount corresponding to the degree at which the shaft pushing tools 5 are pushed into the tube stock 20, so that the valve seat 22 is formed. Accordingly, the width w and the thickness t of the valve seat 22 can be adjusted by the degree at which the shaft pushing tools 5 are pushed into the tube stock 20 and by the length of the insertion portion 51 of each shaft pushing tool 5.

In the above-mentioned Embodiment 1, the step shown in FIG. 2d of further pushing the shaft pushing tools 5 into the tube stock 20 from both ends of the tube stock 20 is performed after the step shown in FIG. 2c of filling the tube stock 20 with fluid. However, the order of steps is not limited to such an order. It is sufficient to prevent a case where the shaft pushing tools 5 are pushed into the tube stock 20 from both ends of the tube stock 20 without applying pressure to the tube stock 20 from the inside. For example, the step of filling the tube stock 20 with fluid may be performed simultaneously with the step of further pushing the shaft pushing tools 5 into the tube stock 20 from both ends of the tube stock 20.

The check valve unit 1 manufactured by the above-mentioned manufacturing method is mounted in the refrigerant pipe 10 forming the refrigeration cycle of an air-conditioning apparatus as shown in FIG. 1. The air-conditioning apparatus includes a refrigeration cycle including at least a compressor, a condenser, an expansion valve, and an evaporator. The check valve unit 1 can be mounted at any desired position in the refrigeration cycle. Further, the check valve unit 1 is reduced in size compared with the related-art check valve, thus giving the higher degree of freedom in arrangement than the related-art check valve unit at the time of being mounted on an air-conditioning apparatus.

As described above, the check valve unit 1 according to Embodiment 1 includes the container body 2 and the valve body 3. The container body 2 includes the valve body housing portion 21, the valve seat 22, and the protruding portion 23, the valve body housing portion 21 having a cylindrical shape, the valve seat 22 being formed at one end portion of the valve body housing portion 21 and protruding from the inner peripheral surface of the valve body housing portion 21, the protruding portion 23 being formed at the other end portion of the valve body housing portion 21 and protruding from the inner peripheral surface of the valve body housing portion 21. The valve body 3 includes the valve portion 31 and the guide portion 32, and is disposed in the container body 2, the valve portion 31 coming into contact with the valve seat 22 at the time of preventing backflow of refrigerant, the guide portion 32 including a plurality of blades.

With such a configuration, it is possible to achieve a reduction in size compared with the related-art check valve.

In the check valve unit 1 according to Embodiment 1, the valve seat 22 is integrally formed with the valve body housing portion 21 by hydroforming. Compared with the related-art check valve, such a configuration can reduce the number of parts and can simplify manufacturing steps, thus achieving a reduction in manufacturing cost.

The method for manufacturing the check valve unit 1 according to Embodiment 1 includes the step of disposing the tube stock 20 in a state of being clamped by the outer dies 4, the step of fixing the tube stock 20 by pushing the shaft pushing tools 5 into the tube stock 20 from both ends of the tube stock 20, the step of filling the tube stock 20 with fluid, the step of forming the valve seat 22 on the inner peripheral surface of the tube stock 20 by further pushing the shaft pushing tools 5 into the tube stock 20 from both ends of the tube stock 20, the step of cutting the tube stock 20 to cause the valve seat 22 to form one end portion, the step of inserting the valve body 3 into the tube stock 20, and the step of forming the protruding portion 23 protruding inward at the other end portion, the other end portion being on a side opposite to the valve seat 22.

The check valve unit 1 manufactured by such a manufacturing method includes neither the small diameter portions nor the tapered portions that are included in the related-art check valve, the small diameter portions forming the inlet port and the outlet port, the tapered portion being formed between each small diameter portion and the large diameter portion. Therefore, the check valve unit 1 can be reduced in size. Further, the valve seat 22 is integrally formed with the valve body housing portion 21 by hydroforming and hence, the check valve unit 1 can be formed by two components, that is, the container body 2 and the valve body 3. Compared with the related-art check valve, the check valve unit 1 can reduce the number of parts and can simplify manufacturing steps, thus achieving a reduction in manufacturing cost.

In the method for manufacturing the check valve unit 1 according to Embodiment 1, each shaft pushing tool 5 includes the insertion portion 51, the pressing portion 52, and the nozzle hole 53. The insertion portion 51 is inserted into the tube stock 20. The pressing portion 52 is pressed against the end surface of the tube stock 20. Fluid is fed into the tube stock 20 through the nozzle hole 53. The insertion portion 51 has a shape where the outer diameter of the insertion portion 51 is substantially equal to the inner diameter of the tube stock 20. With such a manufacturing method, the valve seat 22 can be integrally formed with the valve body housing portion 21 by hydroforming.

In the method for manufacturing the check valve unit according to Embodiment 1, the step of filling the tube stock 20 with fluid is performed simultaneously with the step of forming the valve seat 22 on the inner peripheral surface of the tube stock 20 by further pushing the shaft pushing tools 5 into the tube stock 20 from both ends of the tube stock 20. With such a manufacturing method, the valve seat 22 can be formed while buckling is prevented.

Embodiment 2

Figure 3:
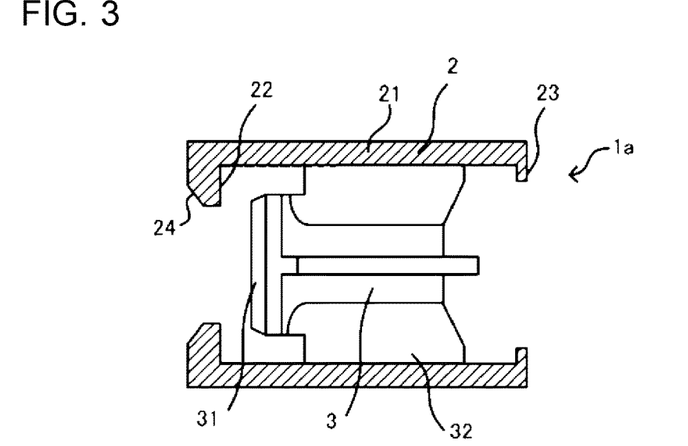
FIG. 3 is a cross-sectional view of a check valve unit according to Embodiment 2 of the present disclosure.

A check valve unit of Embodiment 2 of the present disclosure will be described. FIG. 3 is a cross-sectional view of the check valve unit according to Embodiment 2 of the present disclosure. A check valve unit 1a of Embodiment 2 differs from the check valve unit 1 of Embodiment 1 in that the valve seat 22 has an oblique side portion 24 obtained by cutting off an outer corner that does not come into contact with the valve body 3. In the description for the check valve unit 1a according to Embodiment 2, components identical to the corresponding components of the check valve unit 1 according to Embodiment 1 are given the same reference symbols, and the description of such components is omitted. The description will be made mainly for a point that makes the check valve unit 1a according to Embodiment 2 different from the check valve unit 1 according to Embodiment 1.

The valve seat 22 of Embodiment 2 has the oblique side portion 24 obtained by cutting off the outer corner that does not come into contact with the valve body 3. By cutting off the outer corner of the valve seat 22 as described above to form a slope such that the diameter of an opening port, which is an inlet for refrigerant, gradually reduces, it is possible to reduce pressure loss when refrigerant flows into the check valve unit 1a.

For a method for forming the oblique side portion 24 on the valve seat 22, a related-art method may be adopted where an outer corner that does not come into contact with the valve body 3 is cut off or shaved off. It is sufficient to perform, after the step of cutting the tube stock 20 to cause the valve seat 22 to form one end portion, the step of forming the oblique side portion 24 by cutting off the outer corner of the valve seat 22 that does not come into contact with the valve body 3.

As described above, the valve seat of the check valve unit 1a according to Embodiment 2 has the oblique side portion 24 obtained by cutting off the outer corner that does not come into contact with the valve body 3. With such a configuration, it is possible to reduce pressure loss when refrigerant flows into the check valve unit 1.

Embodiment 3

Figure 4:
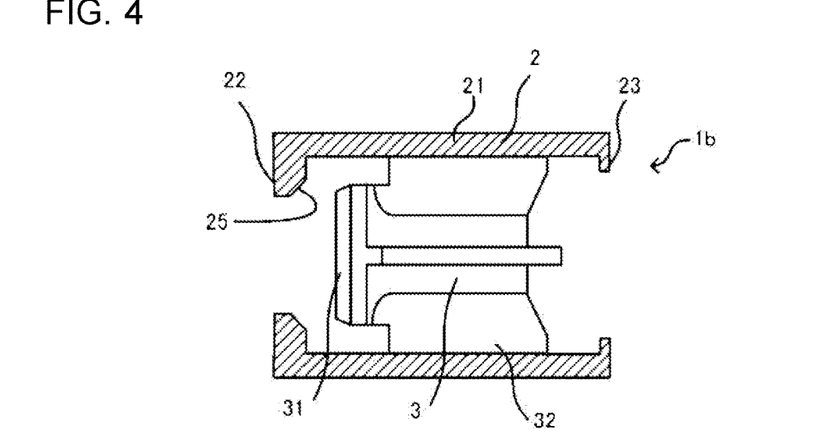
FIG. 4 is a cross-sectional view of a check valve unit according to Embodiment 3 of the present disclosure.

A check valve unit of Embodiment 3 of the present disclosure will be described. FIG. 4 is a cross-sectional view of the check valve unit according to Embodiment 3 of the present disclosure. A check valve unit 1b of Embodiment 3 differs from the check valve unit 1 of Embodiment 1 in that the valve seat 22 has a cut-away portion 25 obtained by cutting off an inner corner that comes into contact with the valve body 3. In the description for the check valve unit 1b according to Embodiment 3, components identical to the corresponding components of the check valve unit 1 according to Embodiment 1 are given the same reference symbols, and the description of such components is omitted. The description will be made mainly for a point that makes the check valve unit 1b according to Embodiment 3 different from the check valve unit 1 according to Embodiment 1.

The valve seat 22 of Embodiment 3 has the cut-away portion 25 obtained by cutting off the inner corner that comes into contact with the valve body 3. The cut-away portion 25 is formed such that the portion that comes into contact with the valve portion 31 at the time of preventing backflow of refrigerant has a highly accurate roundness. By cutting off the inner corner of the valve seat 22 as described above, it is possible to reduce a gap formed between the valve seat 22 and the valve body 3 at the time of preventing backflow of refrigerant and hence, leakage of refrigerant can be reduced.

For a method for forming the cut-away portion 25 on the valve seat 22, a related-art method may be adopted where an inner corner that comes into contact with the valve body 3 is cut off or shaved off. It is sufficient to perform, after the step of cutting the tube stock 20 to cause the valve seat 22 to form one end portion, the step of forming the cut-away portion 25 by cutting off the inner corner of the valve seat 22 that comes into contact with the valve body 3.

As described above, the valve seat 22 of the check valve unit 1*b* according to Embodiment 3 has the cut-away portion 25 obtained by cutting off the inner corner that comes into contact with the valve body 3. The cut-away portion 25 is formed such that the portion that comes into contact with the valve portion 31 at the time of preventing backflow of refrigerant has a highly accurate roundness. With such a configuration, it is possible to reduce a gap formed between the valve seat 22 and the valve body 3 at the time of preventing backflow of refrigerant and hence, leakage of refrigerant can be reduced.

Embodiment 4

Figure 5:
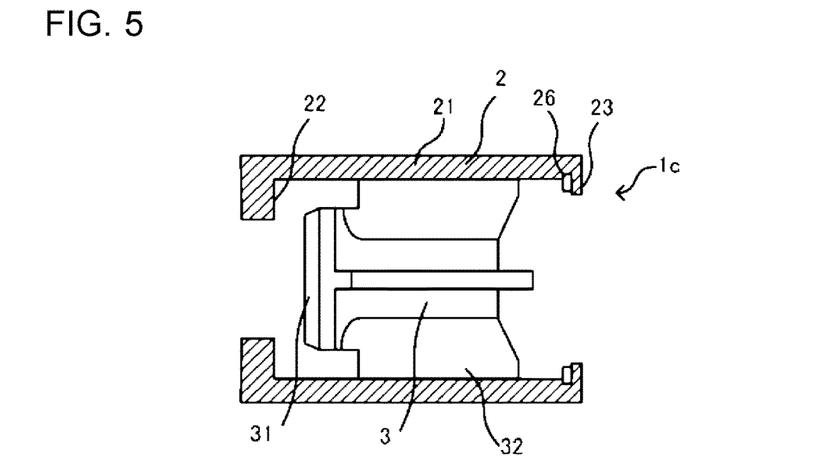
FIG. 5 is a cross-sectional view of a check valve unit according to Embodiment 4 of the present disclosure.

A check valve unit of Embodiment 4 of the present disclosure will be described. FIG. 5 is a cross-sectional view of the check valve unit according to Embodiment 4 of the present disclosure. A check valve unit 1*c* of Embodiment 4 differs from the check valve unit 1 of Embodiment 1 in that the check valve unit 1*c* further includes a valve body confining portion 26 that confines the valve body 3 when refrigerant flows. In the description for the check valve unit 1*c* according to Embodiment 4, components identical to the corresponding components of the check valve unit 1 according to Embodiment 1 are given the same reference symbols, and the description of such components is omitted. The description will be made mainly for a point that makes the check valve unit 1*c* according to Embodiment 4 different from the check valve unit 1 according to Embodiment 1.

The check valve unit 1*c* of Embodiment 4 further includes the valve body confining portion 26 provided on the inner peripheral surface of the valve body housing portion 21 at a position in contact with the protruding portion 23 and configured to confine the valve body 3 when refrigerant flows. In each of the check valve units of Embodiments 1 to 3, the valve body 3 is confined in the valve body housing portion 21 by the protruding portion 23 when refrigerant flows through the check valve unit. In the case of such a configuration, the valve body 3 collides with the protruding portion 23 made of metal, thus causing a large impact sound. In view of the above, the valve body confining portion 26 that confines the valve body 3 when refrigerant flows is additionally mounted. With such a configuration, it is possible to suppress an impact sound caused when the valve body 3 collides with the valve body confining portion 26. By using a resin material, such as polyphenylene sulfide (PPS), polyacetal (POM), or nylon, as a material for forming the valve body confining portion 26, impact sound can be suppressed.

For a method for mounting the valve body confining portion 26, a method is adopted where, after the valve body 3 is inserted into the tube stock, the valve body confining portion 26 is mounted on the inner peripheral surface of the tube stock by welding or other methods at a position on a side opposite to the valve seat 22 as viewed from the valve body 3. Alternatively, a method may be adopted where the valve body confining portion 26 is fixed by forming a step portion by shaving the inner peripheral surface of the tube stock. After the valve body confining portion 26 is mounted in the tube stock, the protruding portion 23 is formed to be in contact with the valve body confining portion 26.

As described above, the check valve unit 1*c* according to Embodiment 4 further includes the valve body confining portion 26 provided on the inner peripheral surface of the valve body housing portion 21 at a position in contact with the protruding portion 23 and configured to confine the valve body 3 when refrigerant flows. With such a configuration, when refrigerant flows through the check valve unit 1*c*, the valve body 3 is confined by the valve body confining portion 26 instead of the protruding portion 23 and hence, it is possible to improve durability of a component.

Embodiment 5

Figure 6:
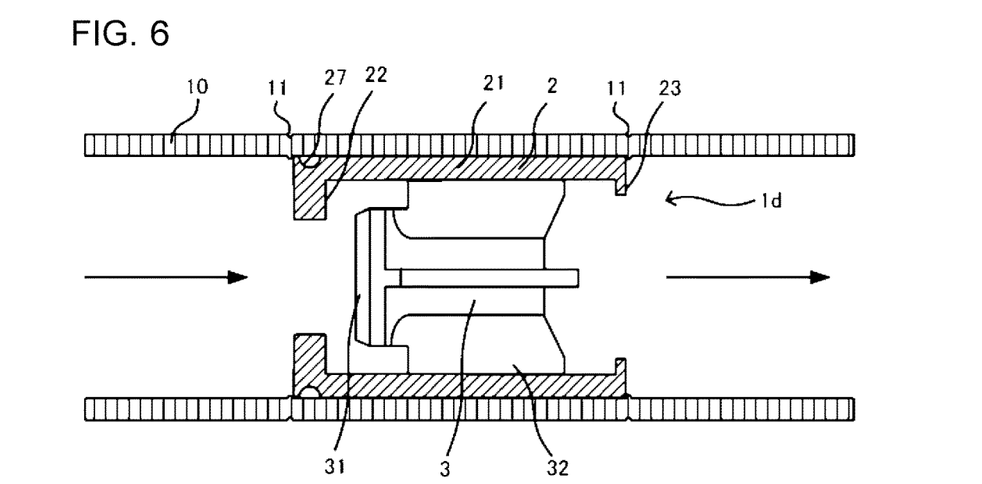
FIG. 6 is a cross-sectional view showing a state where a check valve unit according to Embodiment 5 of the present disclosure is mounted in a refrigerant pipe.

A check valve unit of Embodiment 5 of the present disclosure will be described. FIG. 6 is a cross-sectional view showing a state where the check valve unit according to Embodiment 5 of the present disclosure is mounted in a refrigerant pipe. A check valve unit 1*d* of Embodiment 5 differs from the check valve unit 1 of Embodiment 1 in that the outer peripheral surface of the valve seat 22 of the container body 2 has a recessed portion 27 into which a ring-shaped resin is inserted. In the description for the check valve unit 1*d* according to Embodiment 5, components identical to the corresponding components of the check valve unit 1 according to Embodiment 1 are given the same reference symbols, and the description of such components is omitted. The description will be made mainly for a point that makes the check valve unit 1*d* according to Embodiment 5 different from the check valve unit 1 according to Embodiment 1.

In the container body 2 of the check valve unit 1*d* of Embodiment 5, the outer peripheral surface of the valve seat 22 has the recessed portion 27 into which a ring-shaped resin is inserted. By inserting the ring-shaped resin into the recessed portion 27 when the check valve unit 1*d* is mounted in the refrigerant pipe 10, it is possible to suppress refrigerant flowing through a gap formed between the check valve unit 1*d* and the refrigerant pipe 10. The recessed portion 27 is formed on the outer peripheral surface of the valve seat 22 having a larger thickness than the valve body housing portion 21 and hence, there is no possibility for reduction in the strength of the container body 2.

For a method for forming the recessed portion on the outer peripheral surface of the valve seat 22 of the container body 2, a related-art method, such as shaving, may be adopted. It is sufficient to perform the step of forming the recessed portion after the step of forming the valve seat 22 on the inner peripheral surface of the tube stock 20 by hydroforming.

As described above, in the valve seat of the check valve unit 1*d* according to Embodiment 5, the outer peripheral surface of the valve seat 22 of the container body 2 has the recessed portion 27 into which a ring-shaped resin is inserted. With such a configuration, by mounting the check valve unit 1*d* in the refrigerant pipe 10 with the ring-shaped resin being inserted into the recessed portion 27, it is possible to suppress refrigerant flowing through a gap formed between the check valve unit 1*d* and the refrigerant pipe 10.

Embodiment 6

Figure 7:
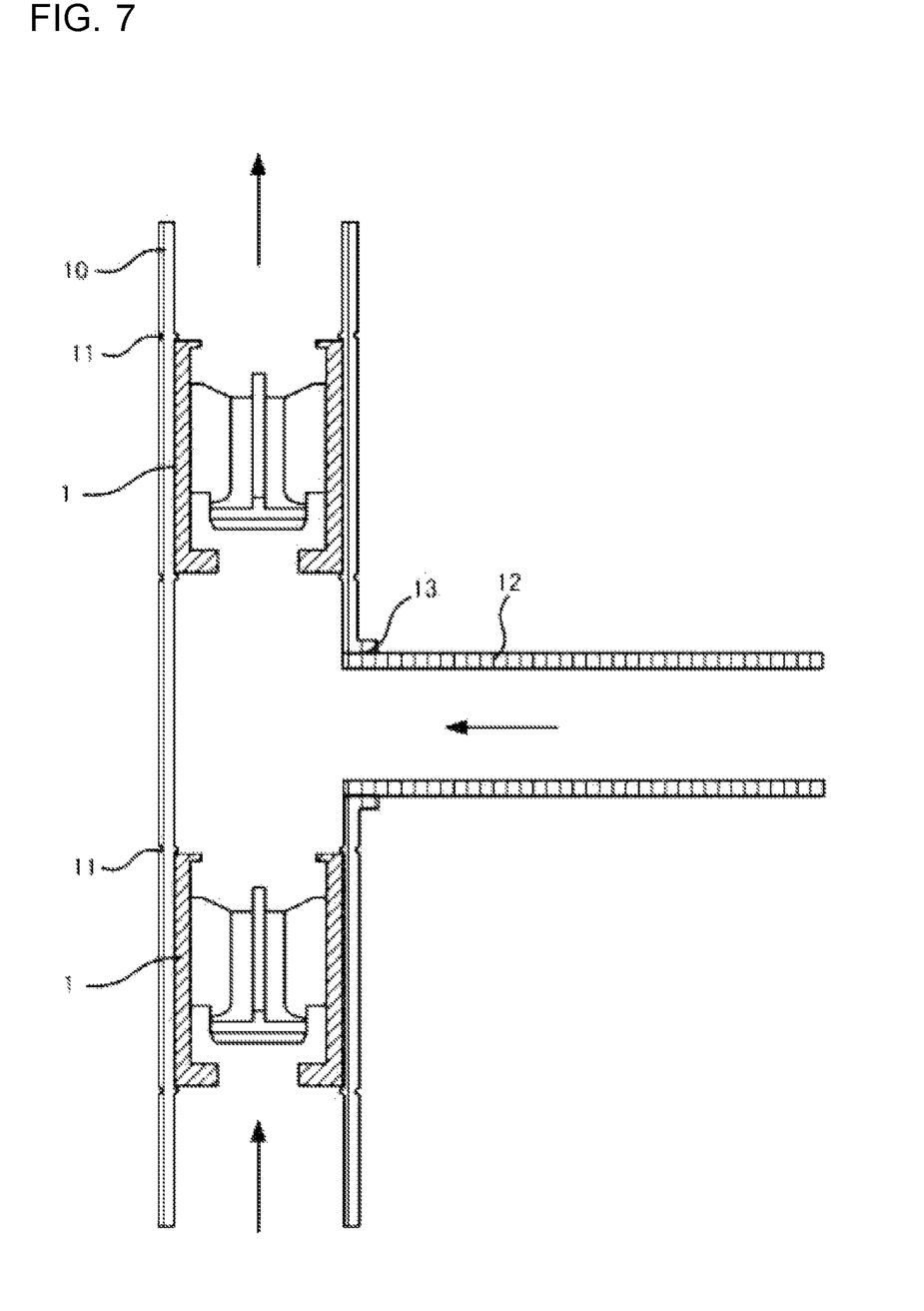
FIG. 7 is a cross-sectional view showing a state where a plurality of check valve units according to the present disclosure are mounted in a refrigerant pipe.

Embodiment 6 of the present disclosure will be described. FIG. 7 is a cross-sectional view showing a state where a plurality of check valve units according to Embodiment 1 of the present disclosure are mounted in a refrigerant pipe. Embodiment 6 differs from Embodiment 1 in that a plurality of check valve units 1 according to Embodiment 1 are mounted in one refrigerant pipe 10. The check valve unit 1 according to Embodiment 6 is identical to the check valve unit 1 according to Embodiment 1 and hence, the description of the check valve unit 1 according to Embodiment 6 is omitted, and the description will be made mainly for a point that makes the check valve unit 1 according to Embodiment 6 different from the check valve unit 1 according to Embodiment 1.

In Embodiment 6, two check valve units 1 are mounted in series in one refrigerant pipe 10. An opening port 13 is formed in the refrigerant pipe 10 by burring or other processing at a position between the check valve units 1, and a refrigerant pipe 12 is connected to the opening port 13 by brazing or other methods. The check valve unit according to the present disclosure is reduced in size, thus allowing mounting of the check valve unit at any desired position in a refrigeration cycle. Therefore, even when a plurality of check valve units are used in combination, the plurality of check valve units as a whole are made compact, thus giving the higher degree of freedom in arrangement than the related-art check valve unit at the time of being mounted on an air-conditioning apparatus. Further, in the case of forming an assembly by using a plurality of related-art check valves, joint pipes are used between the check valves and hence, the number of portions where brazing is applied increases. However, when the check valve units of the present disclosure are used, it is possible to reduce the number of portions where brazing is applied. For a method for mounting the check valve unit 1 in the refrigerant pipe 10, the method described in Embodiment 1 may be adopted.

As described above, Embodiment 6 is directed to the air-conditioning apparatus where the plurality of check valve units are mounted in one refrigerant pipe. The check valve unit according to the present disclosure is reduced in size and hence, even when the plurality of check valve units are mounted in one refrigerant pipe, the plurality of check valve units as a whole are made compact, thus giving the higher degree of freedom in arrangement than the related-art check valve unit at the time of being mounted on an air-conditioning apparatus.

In Embodiment 6, the check valve unit 1 described in Embodiment 1 is used. However, the check valve unit is not limited to such a check valve unit, and the check valve unit of any one of Embodiments 2 to 6 or a check valve unit obtained by combining some check valve units may be used.

The present disclosure has been described heretofore by using the above-mentioned Embodiments. However, some of these Embodiments may be performed in combination. Further, the technical scope of the present disclosure is not limited to the scope described in the above-mentioned Embodiments. Various changes or modifications may be applied to each of the above-mentioned Embodiments without departing from the gist of the disclosure, and Embodiments to which such changes or modifications are applied also fall within the technical scope of the present disclosure.

REFERENCE SIGNS LIST 1, 1a, 1b, 1c, 1d: check valve unit, 2: container body, 3: valve body, 4: outer die, 5: shaft pushing tool, 10: refrigerant pipe, 11: protrusion, 12: refrigerant pipe, 13: opening port, 20: tube stock, 21: valve body housing portion, 22: valve seat, 23: protruding portion, 24: oblique side portion, 25: cut-away portion, 26: valve body confining portion, 27: recessed portion, 31: valve portion, 32: guide portion, 51: insertion portion, 52: pressing portion, 53: nozzle hole, w: width, t: thickness

The invention claimed is:

1. A method for manufacturing a check valve unit, the method comprising:
   disposing a tube stock in a state of being clamped by outer dies;
   fixing the tube stock by pushing shaft pushing tools into the tube stock from both ends of the tube stock;
   filling the tube stock with fluid;
   forming a valve seat on an inner peripheral surface of the tube stock by further pushing the shaft pushing tools into the tube stock from both ends of the tube stock;
   cutting the tube stock to cause the valve seat to form one end portion;
   inserting a valve body into the tube stock; and
   forming a protruding portion that protrudes inward at an other end portion, the other end portion being on a side opposite to the valve seat.

2. The method for manufacturing a check valve unit of claim 1, wherein each of the shaft pushing tools includes an insertion portion, a pressing portion, and a nozzle hole, the insertion portion being inserted into the tube stock, the pressing portion being pressed against an end surface of the tube stock, fluid being fed into the tube stock through the nozzle hole.

3. The method for manufacturing a check valve unit of claim 2, wherein the insertion portion has a shape where an outer diameter of the insertion portion is equal to an inner diameter of the tube stock.

4. The method for manufacturing a check valve unit of claim 1, further comprising forming an oblique side portion by cutting off an outer corner of the valve seat that does not come into contact with the valve body.

5. The method for manufacturing a check valve unit of claim 1, comprising, between the inserting the valve body into the tube stock and the forming the protruding portion, mounting a valve body confining portion on the inner peripheral surface of the tube stock at a position on the side opposite to the valve seat as viewed from the valve body, wherein
   the valve body confining portion is in contact with the protruding portion, and is provided between the protruding portion and the valve body.

6. The method for manufacturing a check valve unit of claim 1, further comprising forming a recessed portion on an outer peripheral surface of the valve seat, a ring-shaped resin being inserted into the recessed portion.

7. The method for manufacturing a check valve unit of claim 1, wherein the filling the tube stock with fluid is performed simultaneously with the forming the valve seat on the inner peripheral surface of the tube stock by further pushing the shaft pushing tools into the tube stock from both ends of the tube stock.

* * * * *